(12) United States Patent
Kinasewich et al.

(10) Patent No.: US 9,315,405 B2
(45) Date of Patent: Apr. 19, 2016

(54) TREATMENT OF PRODUCED WATER

(75) Inventors: Harold Kinasewich, Edmonton (CA); Kyle Greene, Carmangay (CA); Todd Webb, Mundare (CA); Mike Zelen, Victoria (CA)

(73) Assignee: Seair Inc., Spruce Grove (CA)

( * ) Notice: Subject to any disclaimer, the term of this patent is extended or adjusted under 35 U.S.C. 154(b) by 93 days.

(21) Appl. No.: 13/991,061

(22) PCT Filed: Dec. 2, 2011
(Under 37 CFR 1.47)

(86) PCT No.: PCT/CA2011/050748
§ 371 (c)(1),
(2), (4) Date: Dec. 13, 2013

(87) PCT Pub. No.: WO2012/071672
PCT Pub. Date: Jun. 7, 2012

(65) Prior Publication Data
US 2014/0326677 A1    Nov. 6, 2014

Related U.S. Application Data

(60) Provisional application No. 61/418,935, filed on Dec. 2, 2010.

(51) Int. Cl.
C02F 1/24    (2006.01)
C02F 9/02    (2006.01)
C02F 9/00    (2006.01)
C02F 1/20    (2006.01)
C02F 1/74    (2006.01)
C02F 1/78    (2006.01)
B01D 17/02   (2006.01)
B01D 19/00   (2006.01)

(Continued)

(52) U.S. Cl.
CPC .............. *C02F 9/00* (2013.01); *B01D 17/0205* (2013.01); *B01D 19/0005* (2013.01); *C02F 1/20* (2013.01); *C02F 1/24* (2013.01); *C02F 1/74* (2013.01); *C02F 1/78* (2013.01); *C09K 3/32* (2013.01); *E21B 43/40* (2013.01); *B03D 1/1431* (2013.01); *C02F 1/004* (2013.01); *C02F 1/32* (2013.01); *C02F 2101/20* (2013.01); *C02F 2101/203* (2013.01); *C02F 2101/322* (2013.01); *C02F 2305/02* (2013.01)

(58) Field of Classification Search
None
See application file for complete search history.

(56) References Cited

U.S. PATENT DOCUMENTS 4,395,337 A * 7/1983 Ciepiela .................. 210/703
5,545,330 A * 8/1996 Ehrlich ................... 210/703
(Continued)

FOREIGN PATENT DOCUMENTS

| CA | 2183146 A1 | 2/1998 |
| WO | 2007053110 A1 | 5/2007 |
| WO | 2009127870 A2 | 10/2009 |

*Primary Examiner* — Thomas M Lithgow
(74) *Attorney, Agent, or Firm* — Davis & Bujold PLLC; Michael J. Bujold

(57) ABSTRACT

A method of treating produced water containing hydrocarbons includes introducing microbubbles of a lift gas into the produced water in a separation stage to float oil to a surface of the produced water. The top layer of oil is removed from the surface of the produced water. Microbubbles of an oxidizing gas are introduced into the produced water in an aeration stage to oxidize contaminants. Microbubbles of an ultra-violet light treated oxidizing gas are introduced into the produced water in an advanced oxidation stage to oxidize remaining contaminants.

7 Claims, 1 Drawing Sheet

(51) Int. Cl.
  C09K 3/32     (2006.01)
  E21B 43/40    (2006.01)
  *C02F 1/00*       (2006.01)
  *B03D 1/14*       (2006.01)
  *C02F 1/32*       (2006.01)
  *C02F 101/20*     (2006.01)
  *C02F 101/32*     (2006.01)

(56) References Cited

U.S. PATENT DOCUMENTS 6,811,705 B2 * 11/2004 Puetter et al. ................. 210/703
2007/0102359 A1 * 5/2007 Lombardi et al. ............ 210/639
2010/0108615 A1 5/2010 Christophersen et al.

* cited by examiner

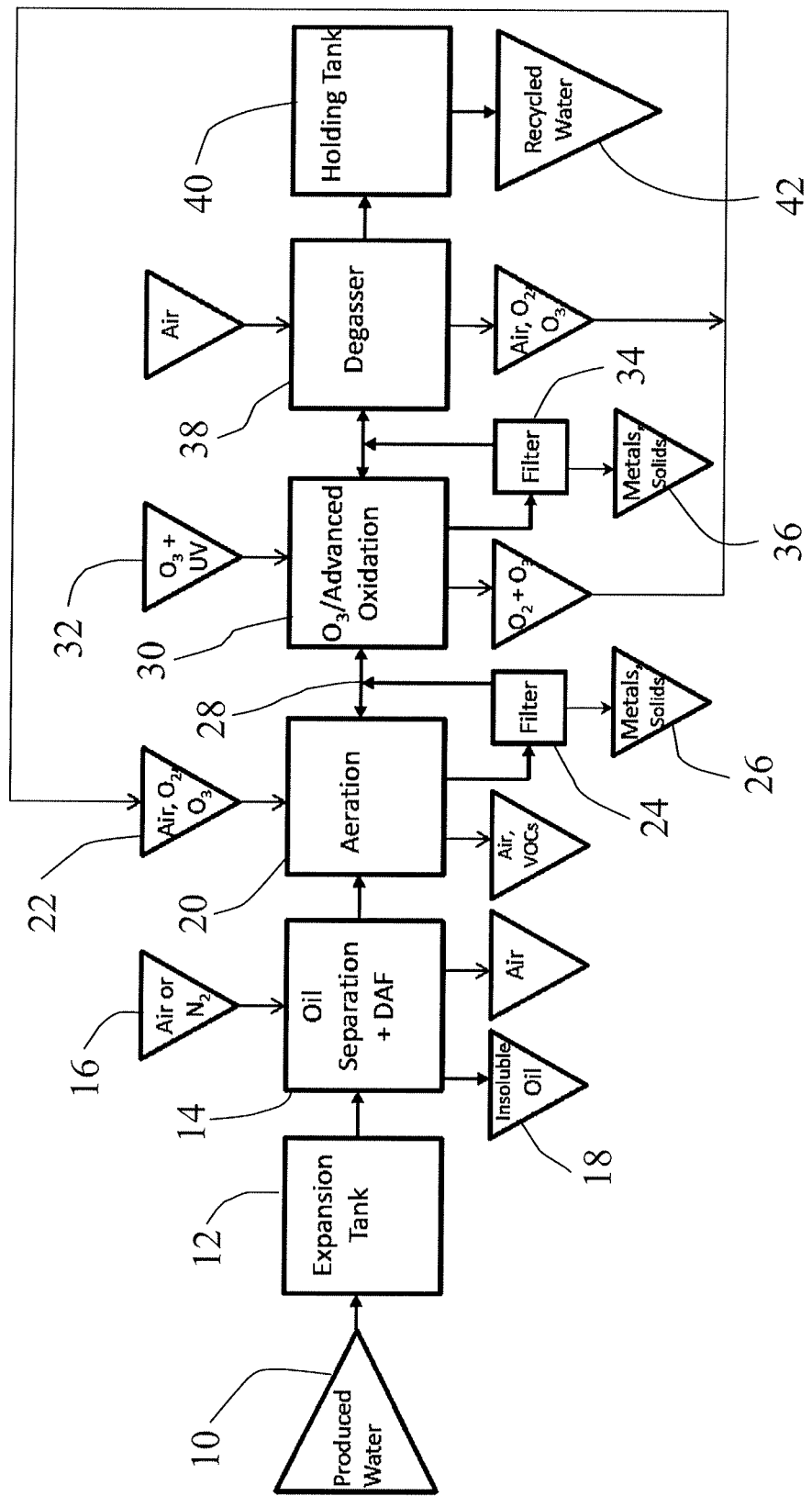

TREATMENT OF PRODUCED WATER

FIELD

This relates to the treatment of produced water, such as produced water from a hydrocarbon producing well that may be latent with oils and heavy metals.

BACKGROUND

Produced water and hydraulic fracturing return water that comes up with the oil or gas typically has a complex matrix of dissolved solids and organics in it. These waters are then taken to a disposal well where they are injected into spent wells or into salt caverns. The oil industry requires significant amount of good "quality" water for production, upgrading, and distribution of oil. Historically produced and return waters were not high enough quality to reuse or recycle. This system provides an economical solution for water treatment and therefore can be recycled, reducing the strain on the fresh water supply.

Today, there are several technologies that specialize in the recycling of these waters. They include evaporation, membrane, and oxidation. Evaporation distils the water to create water that is free of dissolved solids, but not hydrocarbons. There are several different membrane systems in use including hollow fibre, ceramic, nano filtration, and reverse osmosis. The first two are designed for solids and some oil removal, and the last two are designed for dissolved solids removal. Membranes have significant issues with heavy metals and hydrocarbons, and therefore require additional technologies to limit maintenance costs. One system currently in the market uses oxygen/uv/tiO2 to create hydroxyl radicals. The system very complex and involves several layers of membranes. Another system uses ozone and sonication, which introduces the ozone into the solution, sonicates the solution to activate the chemical reaction. Both oxidation processes are for hydrocarbon and heavy metal removal.

All of the described processes have challenges, but the common issue is that they are very energy intensive.

SUMMARY

There is provided a method of treating produced water containing hydrocarbons that includes the introduction of microbubbles of a lift gas into the produced water in a separation stage to float oil to a surface of the produced water. The top layer of oil is removed from the surface of the produced water. Microbubbles of an oxidizing gas are introduced into the produced water in an aeration stage to oxidize contaminants. Microbubbles of an ultra-violet light treated oxidizing gas are introduced into the produced water in an advanced oxidation stage to oxidize remaining contaminants.

Beneficial results have been seen when a further step of filtering the produced water to remove precipitates at the end of at least one of the aeration stage or the advanced oxidation stage is taken.

Although different lift gases may be used, beneficial results have also been seen when the lift gas is diffused into the produced water in the oil separation stage is one of nitrogen or atmospheric air.

Beneficial results had also been seen when a further step of injecting a pH-controlling substance into the aeration stage is taken which helps to maintain the pH at a minimum of 7.

Beneficial results have also been seen when a further step of degassing the produced water at the end of the advanced oxidation stage is taken.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1 is a flow diagram of a produced water treatment plant process.

DETAILED DESCRIPTION

The present process uses ozone/advanced oxidation to remove the hydrocarbons, but also filters the process at specific intervals to remove the heavy metal oxides, which scavenge the ozone if left in solution. This process also included the additional step of pre-aeration, which will oxidize some hydrocarbon, and some metals, limiting the amount of ozone necessary for the process.

The present process removes 2 major contaminants in the water, hydrocarbons and heavy metals. The water remains high in dissolved solids but is acceptable for reuse in drilling mud, hydraulic fracturing, and bore flushing.

Referring to FIG. 1, produced water 10 is deposited via vacuum trucks into an expansion tank 12 where the flow can be stabilized and metered to a consistent flow.

The fluid is then pumped out of the expansion tank 12 into the flow-through oil separator 14 stage. Atmospheric air or nitrogen is introduced to the fluid via a diffusion tower 16, such as a SA 75 available from Seair, Inc. that is continuously re-circulating into the oil separator 14 (drawing from very near to the produced water influent point and discharging in the initial compartment of the oil separator). The microbubbles grab onto and lift the insoluble oil and oil droplets to the surface of the oil separator where it is skimmed or pumped off into an oil holding tank 18.

The separated water flows through the oil separator 14 and is pumped out of the final stage to the aeration tank 20.

From the oil separator 14, the fluid enters a tank 20 which is continuously circulated through a diffusion tower 22, introducing air. The air will increase the dissolved oxygen concentration and oxidize and precipitate iron and other metals.

The fluid is continuously cycled through a filter 24 outside of the tank 20 to collect the precipitate in a precipitate holding tank 26. This fluid nominally is recycled, but will discharge into the next ozone step at regular time intervals through a 3-way valve 28.

The next tank 30 will be continuously cycled with ozone through a Seair diffusion tower 32 cycling enough to sustain mixing and constant gas contact. In the same tank a pump will cycle the fluid through a filter 34 to collect any precipitates that are formed in a precipate holding tank 36. The fluid may be continuously pH adjusted with the addition of sodium hydroxide maintain a pH of at least 7.

The fluid will exit the tank 30 at a flow through a filter 34, a venturi and a degassing tower 38. The fluid will then equilibrate in holding tank 40, and be released to discharge 42.

Salt may be added in the final tank 40 to achieve the salinity necessary for drilling. The water may also be desalinated for use in hydraulic fracturing or other oilfield applications.

Advantages

The above described produced water treatment system is designed for removal of heavy metal, insoluble hydrocarbons, and soluble hydrocarbons; tailoring the recycled water for oilfield purposes. The process is unique in that it uses combination of induced gas floatation, oxygen oxidation combined with ozone oxidation, with optimization processes integrated into it. The process begins with oil separation technology, which uses nitrogen microbubbles to separate and float the insoluble oil to the surface of the water, where it can be removed using any number of skimming methods. The fluid is then filtered to remove any large solids. Next, the fluid is transferred to an oxygenation process where easily oxidizable material such as iron and BTEX are oxidized with oxygen. The microbubbles allow very high contact with the oxygen and the contaminants allowing for fast oxidation. Since the oxygen oxidation is done before the ozone process, ozone usage is optimized in proportion to the concentration of easily oxidizable material.

The next oxidation process is ozonation and advanced oxidation (AO). Ozone is introduced through a diffusion system at very high concentrations which then passes through a UV light, producing the hydroxyl radical. The very high concentration ozone from the air diffusion system requires much less UV to complete the oxidation of the soluble organic compounds. Furthermore, the high concentration of ozone decreases the total residence time for the oxidation to occur. This allows for a much smaller footprint and portability.

Main Points

The Process of IGF-Oxygenation-Ozonation (AO)
Steps can't be moved or changed or altered, the steps in the process must be as described.
Filtration or additional steps can be added through the process, but the main treatment process flow must be consistent.
High Efficiency Diffusion Based IGF
Reduce insoluble residual hydrocarbon levels to a point that makes subsequent ozone treatment economically viable
Smaller microbubble diffusion allows for microdroplet oil separation and surfactant removal.
Oxygenation
Microbubble diffusion decreases reaction time for oxygen oxidation
The reaction zone in the diffusion tower increases the reaction kinetics for oxidation
Removes easily oxidizable material with atmospheric oxygen, subsequent ozone treatment economically viable
Low energy consumption through the diffusion system
Ozonation (Advanced Oxidation)
Microbubble diffusion decreases reaction time for ozone oxidation
The reaction zone in the diffusion tower increases the reaction kinetics for oxidation
Microbubble diffusion decreases total amount of ozone necessary for oxidation
All gasses generated on site.
High concentration ozone requires lower UV intensity.
Degas
Seair degas process uses nitrogen as the stripping gas
Can be added to the process to remove residual oxygen, decreasing chemical costs for oxygen scavengers
Economics
Sequence of operation is designed to optimize revenue generating potential
Maximum oil capture at minimal cost
Minimizes ozone consumption with the diffusion technology, IFG, and aeration components.
Eliminate need for biocides or other consumables
Minimal stabilized residual component
Residual component available for landfill disposal
All water is recycled, and only solids are removed
All gasses are generated on-site In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of treating produced water containing hydrocarbons, comprising:
    introducing microbubbles of a lift gas consisting essentially of nitrogen gas into the produced water in a separation stage to float oil to a surface of the produced water;
    removing a top layer of oil from the surface of the produced water;
    introducing microbubbles of an oxidizing gas into the produced water in an aeration stage to oxidize contaminants selected from the group consisting of iron, metals, heavy metals, and BTEX;
    introducing an ultra-violet light treated oxidizing agent into the produced water in an advanced oxidation stage to oxidize remaining contaminants.

2. The method of claim 1, further comprising a step of filtering the produced water to remove precipitates at the end of at least one of the aeration stage or the advanced oxidization stage.

3. The method of claim 1, wherein the lift gas diffused into the produced water in the oil separation stage consists solely of nitrogen.

4. The method of claim 1, further comprising a step of injecting a pH-controlling substance into the aeration stage.

5. The method of claim 1, further comprising a step of degassing the produced water at the end of the advanced oxidization stage.

6. The method of claim 1, further comprising a step of using atmospheric oxygen as the oxidizing agent in the aeration stage.

7. The method of claim 1, wherein introducing the ultra-violet light treated oxidizing agent comprises using ozone microbubbles.

* * * * *